United States Patent [19]

Godla et al.

[11] Patent Number: 5,091,355
[45] Date of Patent: Feb. 25, 1992

[54] RELIABLE RANEY CATALYST COMPOSITION AND VESSEL FOR CONTAINING SAME

[75] Inventors: Imre Godla; Jozsef Földesi; István Polgár; Endre Gulyás; István Gebhardt; János Kiss; Károly Molnár; András Sugár; Pál Angyal; Ferenc Konok; Zoltán Marina, all of Budapest, Hungary

[73] Assignee: Richter Gedeon Vegyeszeti Gyar Rt., Budapest, Hungary

[21] Appl. No.: 586,864

[22] Filed: Sep. 21, 1990

[30] Foreign Application Priority Data

Sep. 25, 1989 [HU] Hungary ............................ 5021/89

[51] Int. Cl.$^5$ ............................................. B01J 25/00
[52] U.S. Cl. .................................................... 502/301
[58] Field of Search ........................................ 502/301

[56] References Cited

U.S. PATENT DOCUMENTS 4,867,857  9/1989  Von Benda et al. ................ 502/301

Primary Examiner—W. J. Shine
Attorney, Agent, or Firm—Herbert Dubno; Jonathan Myers

[57] ABSTRACT

A Raney catalyst composition which has ice as a solid carrier. The reaction involving the Raney catalyst of the invention is carried out by portionwise adding a Raney catalyst containing ice as solid carrier to the reaction mixture. The operation-safe cylindrical or angular vessel used for the storage and/or handling of the Raney catalyst has a conical casing or side walls joining to the bottom through a bend radius of greater than 0.5 mm. The vessel is covered by a tightly closing cap.

4 Claims, 1 Drawing Sheet

RELIABLE RANEY CATALYST COMPOSITION AND VESSEL FOR CONTAINING SAME

FIELD OF THE INVENTION

Our present invention relates to a reliable Raney catalyst composition which can be handled and used safely and a vessel for the storage and/or handling thereof, as well as to a process for carrying out reactions involving a Raney catalyst.

BACKGROUND OF THE INVENTION

A Raney catalyst may be Raney iron, cobalt or silver and, particularly, can be Raney nickel.

Raney first prepared the Raney catalysts in the twenties in such a way that a metal, acting also alone as a catalyst, primarily nickel and cobalt, was alloyed with aluminum or an other, alkali-soluble metal and, after crushing the alloy, the alkali-soluble metal was dissolved preferably with potassium hydroxide from the alloy. In this way, a highly active metal sponge was obtained which, however, had pyrophoric properties [Römpp's Encyclopedia of Chemistry (in Hungarian) Vol. 4, pages 46 to 47, Ed. Müszaki Könyvkiadó, Budapest (1984)].

It is known that pyrophoric metals pose a serious danger in reactions carried out in the presence of organic solvents since these metals are inflammable in the air and can cause fire or an explosion in more serious cases. For this reason, the active metal sponge is kept under water in the commercially available form.

OBJECT OF THE INVENTION

The aim of the present invention is to decrease or eliminate the hazard of Raney catalysts.

SUMMARY OF THE INVENTION

The aim of the invention has been achieved by freezing the Raney catalyst system stored under water and portionwise adding this solid Raney catalyst composition obtained into the reactor.

In addition, for the easy discharge and handling of the solid Raney catalyst composition a specific vessel was constructed, from which the solid composition can easily be emptied and led to the reactor. This demand was solved by a conical configuration and smooth-surface construction material of the vessel.

Thus, the present invention relates to a reliable Raney catalyst composition, which comprises ice as a solid carrier.

The invention further relates to a process for the reliable accomplishment of reactions involving a Raney catalyst, which comprises portionwise adding a Raney catalyst containing ice as a solid carrier into the reaction mixture.

BRIEF DESCRIPTION OF THE DRAWINGS

The above and other objects, features and advantages of my invention will become more readily apparent from the following description, reference being made to the accompanying highly diagrammatic drawing in which.

SPECIFIC DESCRIPTION

Figure 1A:
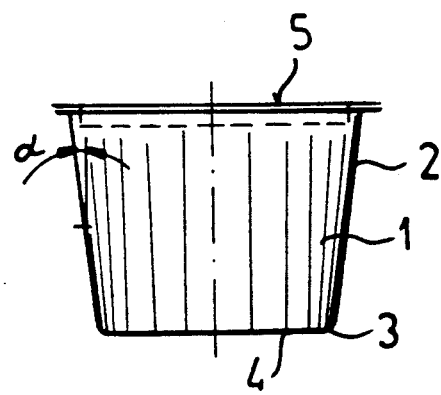
FIG. 1A is an elevational view of a first embodiment of a vessel in accordance with the invention.

The reliable vessel 1 according to the invention comprises a conical casing or side wall 2, a bottom 4, joining the wall 11 through the bend radius 3 and a tightly closing cap 5. The vessel according to the invention is prepared from a construction material of smooth surface.

According to the present invention, the Raney catalyst suspension stored under water is frozen at the site of the production or immediately before the use. Suitably, each unit of the Raney catalyst composition weighs 0.1 to 10 kg which is easy to handle and usually satisfies even the single catalyst demand of the plant reactors. When carrying out the freezing in the plant producing the Raney catalyst, a freezing chain is needed for transportation and storage of the composition, therefore it is more preferred in this case to freeze the Raney catalyst suspension kept under water before the use. The freezing does not require any specific operation. However, it is suitable to carry out the freezing in a vessel, the side wall of which has a smooth surface, the vessel being conic and conglobated, i.e. it does not contain any edge or corner, whereby the frozen Raney catalyst composition (block) can easily be slid from the vessel into the reactor without leaving any reside. Preferably, the vessel is placed into a tepid or warm heating liquid for a short period before use whereby a thin layer of the block melts along the wall of the vessel, so that the block can more easily be slid into the reactor. The reactor usually contains a water-miscible solvent, wherein the ice is instantaneously dissolved; therefore the ice (carrier) does not create any difficulty while the reactor contents are stirred.

SPECIFIC EXAMPLES

The invention is illustrated in detail by the following non-limiting Examples.

EXAMPLE 1

Before use, the water component (carrier) of a catalyst composition containing 80% by weight of Raney catalyst and 20% by weight of water was frozen in a refrigerator or freezing chamber maintained below $-10°$ C.

EXAMPLE 2

Figure 1B:
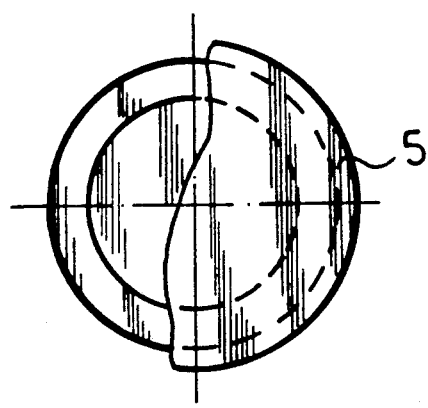
FIG. 1B is a plan view thereof, partly broken away.

The vessel 1 used for the reliable storage and/or handling of the Raney catalyst may be cylindrical or angular. The cylindrical vessel 1 (see FIGS. 1A and 1B) has a conical casing 2 connected with the bottom 4 through a bend radius 3 of greater than 0.5 mm size. The cylindrical vessel 1 bears a tightly closing cap 5. The mean size ratio of the height L to the width D of the cylindrical vessel 1 is $1.3 < L/D < 0.8$, whereas the conic bending angle alpha of the conic casing 2 is $1° < alpha < 15°$.

Figure 2A:
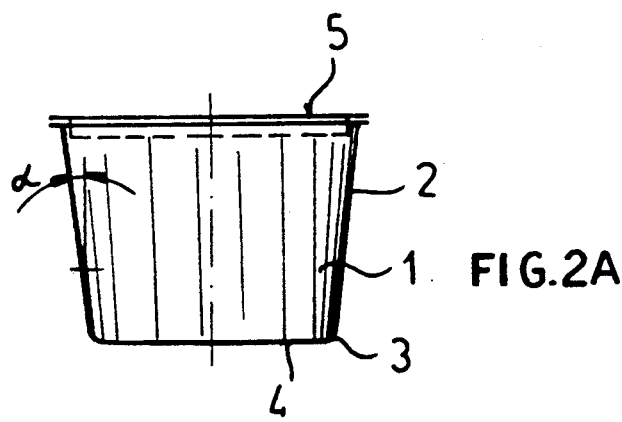
FIG. 2A is an elevational view of a second embodiment of a vessel.
Figure 2B:
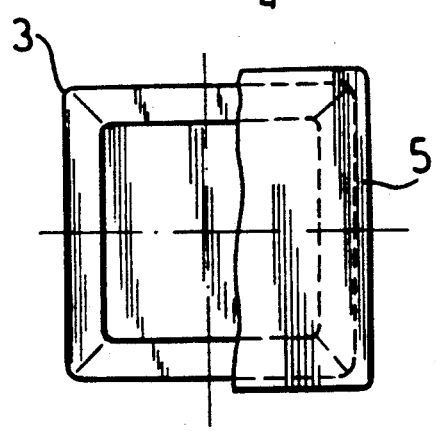
FIG. 2B is a plan view thereof, partly broken away.

The angular vessel 1 (see FIGS. 2A and 2B has conical side walls 2 joining tot he bottom 4 through a bending radius 3 of greater than 0.5 mm size. The angular vessel 1 is provided with a tightly closing cap 5. The mean size ratio of the width A to B is preferably $1.3 < A/B < 0.8$. The conic bending angle alpha of the conic side walls is $1° < alpha < 15°$.

Suitably, the construction material of the conical or angular vessel 1 has a smooth surface. Thus, the catalyst block is easy to slide into the reactor without any remaining residue.

After filling a Raney catalyst composition containing 5 to 50% by weight of water and 95 to 50% by weight of Raney catalyst into the cylindrical or angular vessel 1, the cylindrical or angular vessel 1 is sealed with the tightly closing cap 5. If desired, the water component (carrier) of the Raney catalyst composition is frozen at the site of the production and the catalyst composition is suitably transferred through a freezing chain to the site of the use. It is preferable to freeze the catalyst composition immediately before the use, then to dip the vessel 1 into a calorifer (heating) liquid (water) and thereafter to slide the catalyst composition block, molten along the surfaces 2, 3 and 4, into the reactor through the operation aperture thereof after removing the tightly closing cap 5.

EXAMPLE 3

The vessel of 5 liters volume described in Example 2 (see FIG. 1) containing 5 kg of Raney nickel catalyst and 2 kg of water was placed and kept for 6 hours in a refrigerator at $-20°$ C. Thus, the water component (carrier) of the catalyst composition was frozen to form a block in the vessel.

After introducing 50 kg (123 mol) of 3,3-ethylenedioxy-17$\beta$-hydroxy-17$\alpha$-pregn-5-en-20-yn-21-carboxylic acid lithium salt and 650 liters of methanol into a hydrogenating apparatus, the air space of the equipment was flushed by nitrogen and the equipment was cooled to 5° C.

The vessel containing the Raney nickel catalyst was taken out from the refrigerator, dipped into warm water for a short time, and after opening the cap of the vessel, the content of the vessel was poured into the hydrogenating apparatus through its operation aperture.

After adding the catalyst, the aperture of the hydrogenating apparatus was closed, the gas space of the apparatus is repeatedly flushed by nitrogen, then the system was warmed to 20° C. After replacing the gas space of the apparatus by hydrogen, the hydrogenation was carried out under a pressure of 2 bar.

Hydrogen was continuously added to an absorption of about 7000 liters of hydrogen, then a sample was taken out to monitor the completion of the reaction. Subsequently, the hydrogenation was stopped, the gas space of the apparatus was again replaced by nitrogen, the catalyst was filtered off from the reaction mixture and washed twice with 200 liters of methanol each.

Thereafter, the apparatus and the pressure filter were filled up with water and the catalyst used was collected for regeneration and stored.

The filtrate was evaporated to dryness under reduced pressure to obtain 50.4 kg (122.9 mol) of 3,3-ethylenedioxy-17$\beta$-hydroxy-17$\alpha$-pregn-5-en-21-carboxylic acid lithium salt which is a yield of 99.9% calculated for the theoretical amount.

We claim:

1. A Raney catalyst composition, which comprises a Raney catalyst embedded in ice as a solid carrier.

2. A composition as claimed in claim 1, which comprises 50 to 5% by weight of ice together with 50 to 95% by weight of Raney catalyst.

3. A catalyst package comprising a vessel for the storage and handling of a Raney catalyst composition, which comprises a conical casing or side walls joining a bottom through a bend radius of greater than 0.5 mm and a tightly closing cap for the vessel; and a Raney catalyst composition received in said vessel and consisting essentially of a Raney catalyst embedded in ice as a solid carrier.

4. The catalyst package comprising a vessel as claimed in claim 3 wherein the vessel is conglobated and the side walls thereof are made of a smooth surface construction material.

* * * * *